United States Patent [19]
Lee et al.

[11] Patent Number: 6,161,008
[45] Date of Patent: Dec. 12, 2000

[54] PERSONAL MOBILITY AND COMMUNICATION TERMINATION FOR USERS OPERATING IN A PLURALITY OF HETEROGENEOUS NETWORKS

[75] Inventors: Hee C. Lee; Kalyan K. Basu, both of Plano; Shun Hua Zhou, Dallas; Wei Yuan, Plano; Hua Jiang, Plano; Edith Yeh, Plano; Surnjani Djoko, Richardson, all of Tex.

[73] Assignee: Nortel Networks Limited, Montreal, Canada

[21] Appl. No.: 09/198,063

[22] Filed: Nov. 23, 1998

[51] Int. Cl.[7] ........................................... H04M 3/42
[52] U.S. Cl. ..................... 455/414; 455/445; 455/446; 370/352
[58] Field of Search ................................ 455/414, 415, 455/461, 445, 435, 456, 405, 406; 370/35, 353, 355, 356, 522

[56] References Cited

U.S. PATENT DOCUMENTS 5,329,578  7/1994  Brennan et al. ..................... 455/414

*Primary Examiner*—Curtis A. Kuntz
*Assistant Examiner*—Melur Ramakrishnaiah
*Attorney, Agent, or Firm*—Bruce Garlick; James Harrison

[57] ABSTRACT

A personal mobility system determines a terminal address corresponding to a called user based upon a personal identifier of the called user. The personal mobility system operates in conjunction with a plurality of heterogeneous networks to provide the terminal address corresponding to the called user, independent of the particular network within which the called user currently operates. The personal mobility system includes a personal mobility user application and a personal mobility server application. The personal mobility user application receives a request from a calling user, the request including the personal identifier of a called user. The personal mobility server application couples to the personal mobility user application and includes a plurality of user records. Each user record is respective to a user and is indexed by a respective personal identifier. Further, each user record includes a plurality of terminal records with each of the terminal records including a respective terminal address. The personal mobility server application accesses the user record for the called user based upon the personal identifier, selects a terminal record of the plurality of terminal records based upon the personal identifier, and returns a respective terminal address to the personal mobility user application. The user record may also include a network usage profile and a user profile for the user which are both employed in selecting the terminal identifier.

20 Claims, 7 Drawing Sheets

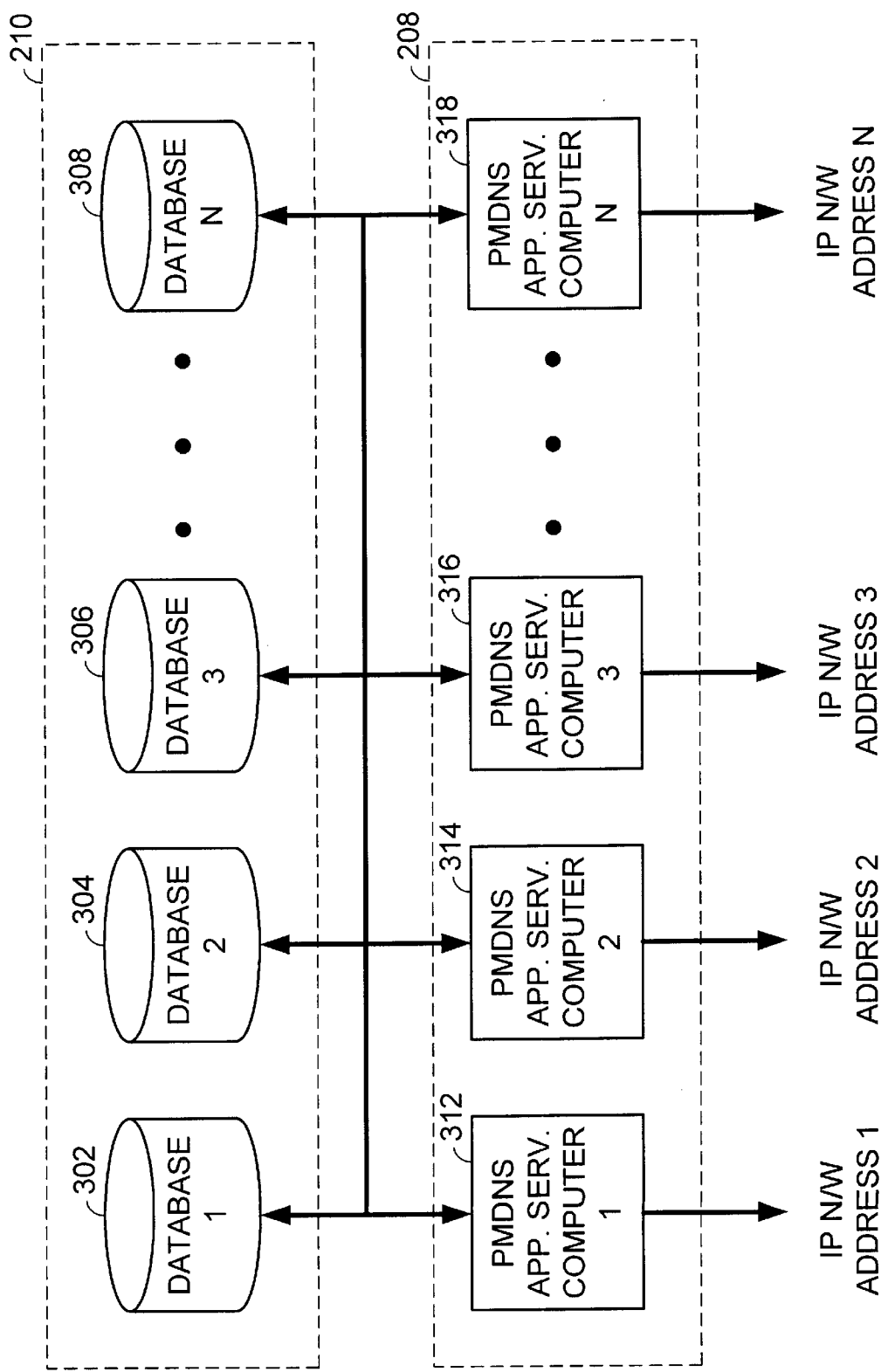

| PID | P/W | TYPE | ADDRESS | TLU |
|---|---|---|---|---|
| ⌐402 | ⌐404 | ⌐406 | ⌐408 | ⌐410 |
| TOM@NORTEL.COM | ROCKET | VOICE | WK PSTN V# | TIME |
| (972) 555-9876 | USER PR. | VOICE | CELLULAR V# | TIME |
| N/W USAGE PROF. | HIST. TBL. | VOICE | HOME PSTN V# | TIME |
| | | VOICE | VOIP ADDRESS | TIME |
| | | DATA | WORK IP ADDR | TIME |
| 412 | | DATA | HOME PSTN D# | TIME |
| | | DATA | CELLULAR D# | TIME |
| ASSIGNEDPID0078 | DONKEY | VOICE | HOME PSTN V# | TIME |
| (972) 555-3546 | USER PR. | VOICE | WORK PSTN# | TIME |
| N/W USAGE PROF. | HIST. TBL. | VOICE | CEULLULAR V# | TIME |
| 414 | | DATA | WORK IP ADDR | TIME |
| RPETTY@NORTEL.COM | 28DAW | VOICE | CEULLULAR V# | TIME |
| (972) 555-1233 | USER PR. | VOICE | WORK PSTN# | TIME |
| N/W USAGE PROF. | HIST. TBL. | VOICE | SAT. PHONE# | TIME |
| | | VOICE | HOME PSTN# | TIME |
| | | RDATA | ROAM IP ADDR | TIME |
| 416 | | DATA | WORK IP ADDR | TIME |
| | | DATA | HOME D# | TIME |
| BSMITH@NORTEL.COM | 287321 | VOICE | CEULLULAR V# | TIME |
| N/W USAGE PROF. | USER PR. | VOICE | HOME PSTN# | TIME |
| | HIST. TBL. | RVOICE | RVOICE PSTN# | TIME |
| 418 | | RDATA | ROAM IP ADDR | TIME |
| | | DATA | HOME D# | TIME |

FIG. 4

PERSONAL MOBILITY AND COMMUNICATION TERMINATION FOR USERS OPERATING IN A PLURALITY OF HETEROGENEOUS NETWORKS

BACKGROUND

1. Technical Field

The present invention relates generally to communication systems that service voice, data and multimedia communications; and more particularly to a personal mobility system that operates in conjunction with a plurality of heterogeneous communication networks to route voice, data and multimedia communications to a user via one or more of the plurality of communication systems based upon a personal identifier of the user.

2. Related Art

Voice communication systems are well known in the art. Examples of voice communication systems include the Public Switched Telephone Network (PSTN), cellular wireless communication systems and other systems that are primarily intended to service voice traffic. Data communication systems are also well known in the art. Examples of data communication systems include the Internet, Local Area Networks (LANs), Wide Area Networks (WANs), asynchronous transfer mode (ATM) networks, among others.

While voice communication systems are primarily intended to service voice traffic, they may also be adapted to service data traffic. Likewise, data communication systems, while primarily intended to service data traffic may also be adapted to service voice traffic (e.g., Internet Protocol (IP) Telephony). In 1996, for the first time in history, the volume of data traffic on carrier backbone networks exceeded the volume of voice traffic. This historical event signaled the fundamental transformation from networks dominated by voice to networks dominated by data. Today, data traffic is growing 10 times faster than voice traffic—more than 30 percent growth per year for data traffic versus three percent growth per year for voice traffic.

From Internet telephony to electronic commerce, the Internet has reshaped the concept of telecommunications. Today, Internet telephony, which includes both Internet voice and fax services, is believed to be the fastest growing type of service on the Internet. The electronic commerce marketplace is already becoming the commercial playing field of choice or an important component of operations for book sales, airline reservations, business and consumer financial services, messenger services, and communications systems, among other areas of commerce.

The convergence of telephony and the Internet is the convergence of two worlds, the dialtone world of straight-line connection for voice and the webtone world of multimedia, multi-point connectivity. Overall, the trend in communications is about being able to reach anywhere, anytime, in any mode, and much more. The full power of webtone is projected to be realized by the integration of an incompatible mix of different access networks, such as data, telephone, enterprise, wireless, satellite, cable TV, and other networks, through the Internet Protocol backbone.

However, as the availability of communications increases, the difficulty of operating the resultant communication systems increases. For example, a single user may access the Internet, the PSTN, a cellular network and other networks in a single day. The single user may be at his or her desk for part of the day, be at home a portion of the day, be on the road for a portion of the day, and be at still other locations during parts of the day. Thus, it is extremely difficult to determine how to reach the user by voice and/or to send data communications to the single user.

Because the single user may be accessing any of these dissimilar networks at any given time, it is difficult, if not impossible to direct a communication to the single user that will reach the single user. Particularly, if an immediate conversation is required, it is difficult to determine a particular number to dial or address to employ to immediately reach the user.

Thus, there is a need in the art for a system and method of operation that assists in properly establishing communications with a user that employs multiple, heterogeneous networks.

SUMMARY OF THE INVENTION

Thus, to overcome the shortcomings of the prior systems, among other shortcomings, a personal mobility system constructed according to the present invention determines a terminal address corresponding to a called user based upon a personal identifier of the called user. The personal mobility system operates in conjunction with a plurality of heterogeneous networks to provide the terminal address corresponding to the called user, independent of the particular network within which the called user currently operates.

To accomplish such operation, the personal mobility system includes a personal mobility user application and a personal mobility server application. The personal mobility user application receives a request from a calling user, the request including the personal identifier of a called user. The personal mobility server application couples to the personal mobility user application and includes a plurality of user records. Each user record is respective to a user and is indexed by a respective personal identifier. Further, each user record includes a plurality of terminal records with each of the terminal records including a respective terminal address.

In one operation, the personal mobility server application accesses the user record for the called user based upon the personal identifier. The mobility server application then selects a terminal record of the plurality of terminal records based upon the personal identifier and returns a respective terminal address to the personal mobility user application.

The personal mobility system supports operation across a plurality of heterogeneous networks including, for example, Internet Protocol networks, Public Switched Telephone Networks, cellular wireless networks, wireless satellite networks, local area networks and wide area networks. In one embodiment, the personal mobility system server couples to an Internet Protocol network and is accessed via other of the networks through gateways. In such fashion, the personal mobility system server is centralized and may be accessed using known techniques.

The user record may further include a network usage profile for the user which is used by the personal mobility server application to select the terminal record of the plurality of terminal records. In such case, the user record may also include a historical usage table for the user which is employed by the personal mobility server application to create the network usage profile for the user. The historical usage table is generated over time based upon the user's usage of the terminals identified in a respective user record.

The user record may also include a user profile for the user. The user profile is entered by the user and indicates his or her preferences regarding delivery of communications.

With the user profile entered, the personal mobility server application selects the terminal record of the plurality of terminal records based upon the user profile of the called user. The user enters his or her preferences via the personal mobility system user application by interacting with the personal mobility system application server.

In one particular construction of the personal mobility system, the personal mobility server includes a personal mobility application server that interfaces with the personal mobility user application and a personal mobility database server coupled to the personal mobility application server that stores the user records. This construction therefore divides application processing functions from database functions. In such case, the personal mobility application server may include a plurality of intercoupled server computers that allow for expansion. Further, the personal mobility application server may include a plurality of intercoupled databases that also provide for expansion.

Moreover, other aspects of the present invention will become apparent with further reference to the drawings and specification which follow.

BRIEF DESCRIPTION OF THE DRAWINGS

FIG. 3 is a block diagram illustrating the structure of a PMDNS server in which a plurality of separate PMDNS application server computers implement a PMDNS application server and a plurality of separate databases implement a PMDNS database server according to the present invention;

FIG. 4 is tabular diagram illustrating a plurality of user records stored in a PMDNS database server according to the present invention;

A better understanding of the present invention can be obtained when the following detailed description of the preferred embodiment is considered in conjunction with the following drawings, in which:

DETAILED DESCRIPTION OF THE DRAWINGS

Figure 1:
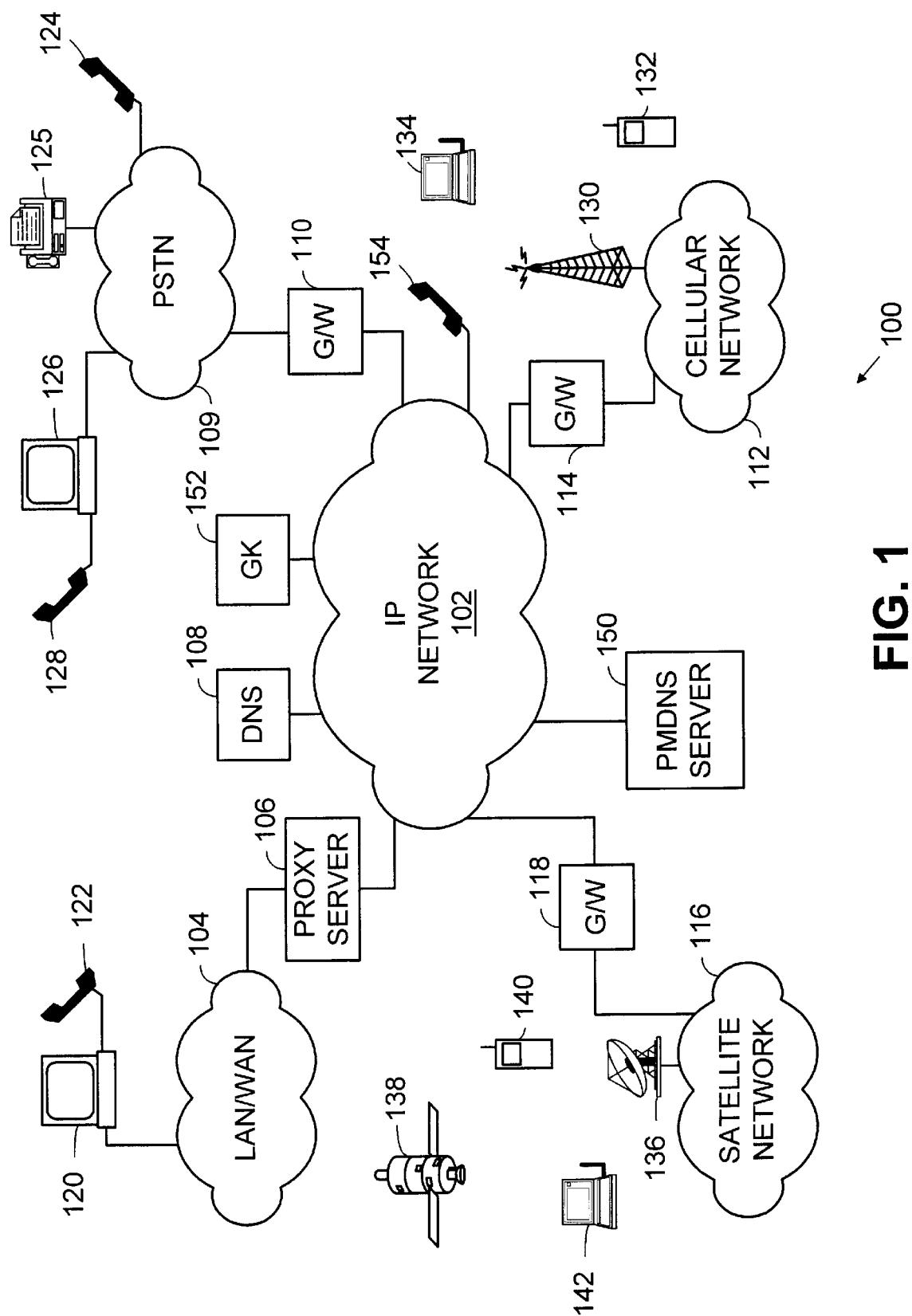
FIG. 1 is a system diagram illustrating a plurality of interconnected heterogeneous in which a personal mobility system constructed according to the present invention is been deployed.

FIG. 1 is a system diagram illustrating a plurality of interconnected heterogeneous networks in which a personal mobility system constructed according to the present invention has been deployed. As illustrated, an Internet Protocol (IP) network 102, a Local Area Network (LAN)/Wide Area Network (WAN) 104, the Public Switched Telephone Network (PSTN) 108, a cellular wireless network 112 and a satellite communication network 116 make up the plurality of heterogeneous networks serviced by the personal mobility system of the present invention.

The IP network 102 may be the publicly available IP network, a private IP network or a combination of public and private IP networks. In any case, the IP network 102 operates according to the Internet Protocol and routes packets among its many switches and through its many transmission paths. IP networks 102 are generally known in the art to be expandable, fairly easy to use and heavily supported. Coupled to the IP network 102 is a Domain Name Server (DNS) 108 to which queries may be sent, such queries each requesting an IP address based upon a Uniform Resource Locator (URL). The IP network 102 supports 32 bit IP addresses as well as 128 bit IP addresses which are currently in the planning stage. The IP network 102 also supports Mobile IP routing protocols.

The LAN/WAN 104 couples to the IP network 102 via a proxy server 106 (or another connection). The LAN/WAN 104 may operate according to various communication protocols such as the Internet Protocol, the Asynchronous Transfer Mode (ATM) protocol or other known packet switched protocols. The proxy server 106 serves to route data between the IP network 102 and the LAN/WAN 104. A firewall that precludes unwanted communications from entering the LAN/WAN 104 may also be located at the location of the proxy server 106.

Computer 120 couples to the LAN/WAN 104 and supports communications with the LAN/WAN 104. The computer 120 may employ the LAN/WAN and proxy server 106 to communicate with other devices across the IP network 102. Such communications are generally known in the art and will not be further described herein except as to expand upon the teachings of the present invention. As is also shown, phone 122 couples to computer 120 and may be employed to initiate IP Telephony communications with another phone or voice terminal using IP Telephony. In such an IP telephony system, a gatekeeper 152 is deployed by a service provider to manage IP telephony for its users. An IP telephone 154 connected to the IP network 102 (or other telephone, e.g., telephone 124) may communicate with phone 122 using IP telephony.

The PSTN 109 is a circuit switched network that is primarily employed for voice communications, such as those enabled by a standard phone 124. However, the PSTN 109 also supports the transmission of data. Data transmissions may be supported to a tone based terminal such as a FAX machine 125, to a tone based modem contained in computer 126 or to another device that couples to the PSTN 109 via a digital connection, such as an Integrated Services Digital Network (ISDN) line, an Asynchronous Digital Subscriber Line (ADSL), or another digital connection to a terminal that supports such a connection. As illustrated, a voice terminal such as phone 128 may couple to the PSTN 109 via the computer 126. In such a configuration, the computer 126 may support IP telephony with terminal 122, for example.

The cellular network 112 supports wireless communications with terminals operating in its service area (which may cover a city, county, state, country, etc.). As is known, the cellular network 112 will include a plurality of towers, e.g. 130, that each service communications within a respective cell. Wireless terminals that may operate in conjunction with the cellular network 112 include wireless handsets 132 and wirelessly enabled laptop computers 134, for example. The cellular network 112 couples to the IP network 102 via a gateway 114.

The cellular network 112 operates according to an operating standard which may be the Advanced Mobile Phone System (AMPS) standard, the Code Division Multiple Access (CDMA) standard, the Time Division Multiple Access (TDMA) standard or the Global Standard for Mobility (GSM), for example. Independent of the standard(s) supported by the cellular network 112, the cellular network 112 supports voice and data communications with the terminal units, e.g., 132 and 134.

The satellite network 116 includes at least one satellite dish 136 that operates in conjunction with a satellite 138 to provide satellite communications with a plurality of terminals, e.g., laptop computer 142 and satellite handset 140. The satellite network 116 may be serviced by one or more geosynchronous orbiting satellites, a plurality of medium earth orbit satellites or a plurality of low earth orbit satellites. In any case, the satellite network 116 services voice and data communications and couples to the IP network 102 via a gateway 118.

According to the present invention, a personal mobility domain name (PMDNS) system includes a PMDNS server 150 and a PMDNS user application. Each PMDNS user application is either contained on a terminal of a user or a gateway, e.g., 110, 114 or 118. Terminals computer 120, computer 126, phone 124, laptop computer 134, phone 132, laptop computer 142 and satellite handset 140 are all compliant with the personal mobility system. However, not all of these terminals support the PMDNS user application. In such cases, the PMDNS user application resides upon a related gateway. In this fashion, each of these terminals accesses a PMDNS user application which operates in conjunction with the PMDNS server 150 to provide the personal mobility system operation according to the present invention.

According to the present invention, a personal identifier (PID) is assigned to each user of the personal mobility system. The PID serves as a thread to a group of series of terminals he owns each identified by its terminal identifier (TID, also referred to interchangeably as terminal address). For example, Tom Jones, who works at Nortel Networks has the email address tom@nortel.com, the email address also serves as PID for Tom Jones. However, if Tom Jones does not have an email address, his PID could be his phone number, (972) 684-0800.

At least one TID is associated with the PID of Tom Jones. For example, assume that Tom Jones uses computer 120 while at work, which is coupled to the IP network 102 via the LAN/WAN 104. The computer 120 has a unique address at which it may be reached. Such unique address is the TID for the computer 120 and is associated with the PID of tom@nortel.com. Additionally, telephone 122 serves as Tom Jones wired work telephone. Thus, the phone number (972) 684-0800, which may be used to dial the telephone 122 is the TID for such phone and is associated with the PID of Tom Jones. Moreover, Tom Jones has a home computer 126 coupled to the IP network 102 via the PSTN 109. The home computer 126 has an associated telephone number (214) 891-2368 which serves as the TID for the computer 126 and is associated with the PID of Tom Jones. Finally, cellular telephone 132 is used by Tom Jones while he is traveling. The number (972) 555-3234 of the cellular telephone serves as the TID for the cellular telephone 132 and is associated with Tom Jones' PID. Each of these TIDs is stored on the PMDNS server 150, cross referenced to Tom Jones' PID and may be accessed when an attempt is made to locate Tom Jones.

The PID serves to identify a user and an entry point for operation with the PMDNS of the present invention. When a called user's PID is launched with desired service options by a PMDNS user application, the user terminal queries the PMDNS server 150 in the IP network 102 for one or more TIDs corresponding to the PID. The PMDNS application server receives a request from the PMDNS user application and makes an intelligent network routing decision regarding 'when the user is using what terminal and type of service desired, e.g., POTS, e-mail, video, and fax', based upon the user's normal behavior observed by the network or his direct indication, and therefore maps the PID to a certain TID. The selected TID and the IP address of its associated gateway will be sent to the user terminal or the access network for the setup and delivery of the session to the user at that terminal.

The goal of reaching the user at an appropriate terminal based upon the launched PID is similar to the concept of searching for an actual IP address from the domain name via a DNS 108. However, the DNS 108 alone is not sufficient to solve the addressing problem since it only maps URLs to IP addresses. While expanding DNS resources to provide such additional mapping could also be used, the approach comes with several disadvantages, including large storage requirements, lengthy searching time, a limitation to static data, no multimedia support, and the need for a new unified phone number. Further, because the construction of DNSs has become substantially standardized, altering DNSs to accomplish such tasks would require replacement/modification of all DNSs that have been deployed.

According to a described embodiment, the PMDNS complies with the internet DEN architecture to separate the directory service traffic from conventional DNS service traffic. PMDNS uses dynamic data to provide most currently active terminal address of the user, by tracking the mobility of user usage and thus. PMDNS also supports multimedia service and mobile IPv6. PMDNS uses DNS-like information flows and message formats between the PMDNS server 150 and the PMDNS user application.

Using such a technique, a particular user may be contacted at a terminal that he is not only most likely to be at (both place wise and time wise), but that also has the proper capability to receive the incoming session. In a sense, the PID is a counterpart of high-level machine name in DNS and the TID is a counterpart of the low-level IP address in a DNS. The PMDNS server that maps the PID to an actual TID, is a counterpart of DNS server. The PMDNS directory stores the information about the user, including PID, associated TIDs, billing address, service option, and etc. It is a counterpart of database storing resource records (RRs).

However, the PMDNS is different from DNS in several aspects. First, the directory service traffic is separated from the conventional DNS service traffic, which makes it easy to add new value-added service and to comply with the DEN architecture concept. Second, the information provided by the PMDNS is dynamic data, which has taking into account the mobility information, unlike the static data provided by the conventional DNS. Thirdly, PMDNS would support multimedia service, in selecting a proper TID, the incoming session's characteristic and the terminal's capability, whether it is voice, video, data or short message, would be both considered.

Figure 2:
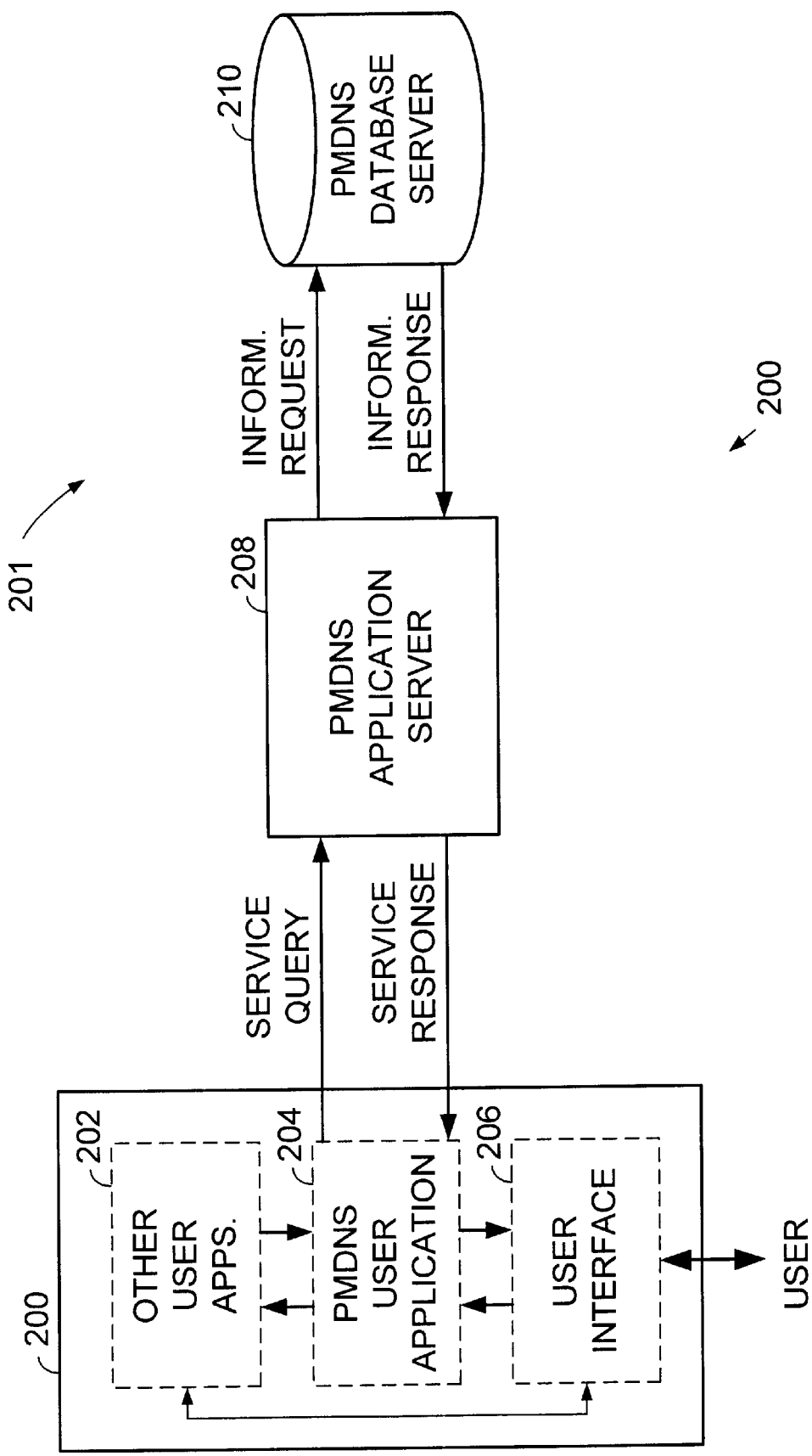
FIG. 2 is a block diagram generally illustrating the structure and interaction of components of a personal mobility system constructed according to the present invention.

FIG. 2 is a block diagram generally illustrating the structure and interaction of components of a personal mobility system constructed according to the present invention. Illustrated is a user terminal 200 and a PMDNS server 201 that includes a PMDNS application server 208 and a PMDNS database server 210. The user terminal 200 has thereupon a PMDNS user application 204 which communicates with the PMDNS application server 208.

The user terminal 200 may be a computer, a PMDNS enabled telephone or another terminal capable of voice and/or data communications. The user terminal 200 includes not only the PMDNS user application 204 but other user applications 202 and a user interface 206 that couples the user terminal 200 to the user himself/herself. The other user applications 202 that may be present upon the user terminal 200 depend upon the terminal type. For example, if the user terminal 200 is a desktop or laptop computer, the other user 202 applications may include communication programs, productivity programs, audio programs or other programs that operate on a computer. If the user terminal is a telephone, the other user applications 202 may include messaging systems or other types of applications supported by the telephone.

The PMDNS user application 204 resides at the end user terminal or gatekeeper for an internet terminal. Alternatively, for a traditional voice-based terminal (e.g., coupled to the PSTN 109, cellular network 112 or satellite network 116), the PMDNS user application resides at the gateway or gatekeeper. The PMDNS user application 204 is the user interface that accepts from the caller the launched PID of the called user with the desired service options and returns to the caller the selected TID of the called user. Upon receiving a query having a launched PID, the PMDNS user application first checks a local cache to see if the launched PID is available. If it is available and the time to live (TTL) has not expired, then the stored TID will be returned to the caller. Otherwise, the PMDNS user application will send a query to its PMDNS application server 208, which checks the PMDNS database server 210 to find a proper TID of the called user. Besides feeding the caller with a TID of the called user, the PMDNS user application also interprets the received TID and processes error messages when appropriate.

Within the PMDNS user application 204, two configurations are made at the IP terminal or gateway/gatekeeper. First, the configuration of the address and TTL of its local PMDNS application server 208 are entered by the user. Second, the configuration of the user profile is entered by the user. The configuration of the local PMDNS application server 208 can be accomplished by using dynamic host configuration protocol (DHCP), server record (SRV) in DNS, service location protocol (SLP), or manual configuration. The original DHCP was designed to provide configuration parameters to internet hosts.

Here, the information regarding the PMDNS application server 208 could be identified as a new parameter passed by DHCP, together with the existing parameters such as IP address and domain name of the host, router IP address, subnet mask, and etc. The SRV record is a type of DNS resource record (RR) which specifies the location of the server(s) for a specific protocol and domain. Here, the location of the PMDNS application server is to be added in the SRV record, indexed under the given domain name of the host or the domain name of host's router. SLP was originally designed for the discovery and selection of network services, using user agent (UA), service agent (SA), and directory agent (DA). To find the location of a service, UA sends out a service request to DA, which sends back a service reply with the address of the server providing the requested service. This scheme could be easily adapted to the discovering of a PMDNS application server. The manual configuration means the addresses of the PMDNS application server 208 should be configured manually to the hosts by a network administrator.

The configuration of the user profiles provide the user with control regarding which terminal at he would like to be reached, overruling the possible terminal that the network may select. In this manner, the probability of successfully delivering an incoming session to the user can be improved. Besides, the direct instruction from the user reduces the signaling traffic and PMDNS server 201 load, which would otherwise make an intelligent guess regarding the terminal to receive delivery. The users can assign/delete preferences, query preferences, or change passwords through the PMDNS user application 204. The messaging would observe a new protocol for the communications between the PMDNS user application 204 and the PMDNS application server 208, and the Lightweight Directory Access Protocol (LDAP) protocol between the PMDNS application server 208 and PMDNS database server 210.

The PMDNS application server 208 couples to each user terminal via one or more intermediate heterogeneous networks. In the example of FIG. 1, the PMDNS server 150 includes the PMDNS application server 208 and the PMDNS database server 210. In such case, the PMDNS application server 208 couples to terminals via the IP network 102 and, in some cases, the LAN/WAN 104, the PSTN 109, the cellular network 112 and the satellite network 116 as well. With the PMDNS user application 204 resident upon a gateway, e.g., 110, the PMDNS user application 204 couples to the PMDNS server application 208 via the IP network 102 alone.

Typical communications between a PMDNS user application 204 and the PMDNS application server 208 take the form of service queries and service responses. In a service query, the PMDNS user application 204 requests that the PMDNS application server 208 perform a function. Upon receipt of the service query, the PMDNS server 208 may perform such function. Upon initial receipt of the service query, or subsequent to performing an operation based thereupon, the PMDNS application server may respond to the PMDNS user application 204 in a service response.

The PMDNS application server 208 is the engine running between the PMDNS user application 204 and the PMDNS database server 210, answering the question of which terminal(s) to reach when the user's PID is dialed. In other words, the PMDNS application server 208 returns TID(s) when a query including a PID is received from the PMDNS user application 204 is received requesting TID(s). The decision made by the PMDNS application server 208 takes into account the information provided in the query from the PMDNS user application 204, as well as the information to be retrieved from the PMDNS database server 210.

There are several decision-affecting factors. A first factor is the user profile, which is a direct indication from the user regarding which terminal he wants to receive any incoming session. Unless the user has de-registered himself for the terminal or a time-to-live timer for user's registering himself has expired, the TID selected by the user will be used in response to a PID query. However, with the user not able to foresee the nature of the incoming session, it is possible that the user-selected terminal is not capable to receive an incoming session, such as a mobile handset not ready to receive a file transfer. It is proposed here that an announcement is to be made to the terminal. The incoming session can be delivered to a capability-ready terminal, or a media conversion can be made and a modified incoming session can be delivered to the terminal. In one example of such operation, voice is converted to text and in another example, text is converted to voice.

A second factor in the decision making is the terminal network usage profile, which is a profile of the probability of when the user is using which terminal of what capability. This is the terminal network usage profile observed by the network, and will be used together with user profiles complementarily, that is, when the latter is inactive, the tracking by the network would be used. This profile will be based upon historical usage, which is periodically updated version of the profile that has been observed over a period of time, such as a week. Both the terminal network usage profile and the historical usage are to be stored in the PMDNS database server. In the profile, it is categorized in the order of terminal capability, while for each terminal, it is listed the probability of its usage at different intervals on different days in a week.

The terminal network usage profile provides the network with the long-term behavior of the user; short-term behavior called last activity is identified here as the third factor that affects the decision making. Last activity should be used together with the terminal network usage profile, to shape the decision of which terminal is most likely to be used by the user right now. This piece of information would be useful when the time elapse between the last activity and current query is relatively small, meaning that most likely that the user is still close by the terminal that was last active.

The fourth factor is the terminal capability. The ideal case would be to deliver the incoming session to a terminal that is capable for reception. Both the session characteristic and the terminal capability are categorized, such as voice, data, and multimedia. The session characteristic would be conveyed in the PID query coming from the PMDNS user application, while the terminal capability would be indicated in the database.

The PMDNS application server 208 interfaces with both the PMDNS user application 204 and the PMDNS database server 210. The communication between the PMDNS user application 204 and the PMDNS application server 208 will use the information flow and message format which are both DNS-based, with new values opened up in certain fields of the message. The communication between the PMDNS application server 208 and the PMDNS database server would use the LDAP, following DEN information model and the directory schema.

The information flow between the PMDNS user application 204 and the PMDNS application server 208 is simply query and response, just like the conventional DNS. The message format between the PMDNS user application 204 and the PMDNS application server 208 is DNS-based, same for the query and the response, each with certain modification to accommodate personal mobility. The query of a PID is indicated in the OPCODE field. The query includes the launched PID, dialing TID, and session characteristic. The launched PID and dialing TID would be placed in the QNAME field, while the session characteristic would be indicated in the QTYPE field. The response about the PID would include TID and the IP address of the gateway from the access network, if the endpoint were not an IP terminal. These two pieces of information would be placed in the RDATA field in the Answer Section. If more than one TID is desired, for the purpose of simultaneous or sequential ringing, then that information could be placed in the Additional Information Section.

The communication between the PMDNS application server 208 and the PMDNS database server uses, in one embodiment, employs LDAP, which is based on user-server model and runs directly on TCP/IP. The LDAP provides a standards-based mechanism, permitting any user, server, or application to access any directory service supporting LDAP interface.

The PMDNS database server 210 stores all database user records required by the PMDNS application server 208. Such database user records include the PIDs of the users and their related TID, among other information. In a typical database user record corresponding to a PID, the PMDNS database server 210 stores a plurality of TIDs for each PID. In accessing the PMDNS database server 210, the PMDNS application server 208 issues an information request (or another request). The PMDNS database server 210 performs a database operation based upon the information request and returns an information response based upon the request. Such requests may include providing TIDs based upon a PID supplied by the PMDNS application server 208, adding user records, deleting user records, updating user records, adding terminal records for a TID, deleting Terminal records for a PID and modifying Terminal records for a PID, among others.

The PMDNS application server 208 manages the PMDNS database server 210 using LDAP and the DEN model and uses its base schema to construct the information. The PMDNS directory information is based on entries arranged in a hierarchical tree-like structure and divided among servers in a geographical/organizational distribution. An object is represented by an entry in the directory, containing a set of attributes. In each entry, there is a special attribute called objectClass, which identifies type of entry and determines subsequent attributes.

FIG. 3 illustrates a structure of a PMDNS server in which a plurality of separate PMDNS application server computers 312 through 318 implement the PMDNS application server 208 and a plurality of separate databases 302 through 308 implement the PMDNS database server 210. The plurality of PMDNS application server computers 312-318 intercouple with one another and with the plurality of databases 302–308. Such intercoupling may be via a LAN which supports Ethernet or another LAN standard, an ATM ring, or another high bandwidth interconnection which supports high speed accesses of the databases 302–308 by the PMDNS application server computers 312–318.

As shown, the plurality of PMDNS application server computers 312–318 couple to the IP network. However, in another implementation, only one of the server computers, or a dedicated router, receives all service queries, services some of the service queries, and redirects or re-routes other of the service requests to other of the server computers. Thus, the PMDNS application server 208 functions are distributed among the plurality of PMDNS application server computers 312–318, with the number of such server computers dictated by the total required processing load.

As is recalled, processing operations supported by the server computers relate to the storage, alteration and access of TIDs that are indexed with respect to PIDs. A typical access of the PMDNS application server will be based upon a particular PID. Thus, it is appropriate to segregate processing functions among the plurality of server computers 312–318 based upon a PID included with the processing request.

One manner of segregating processing requests among the plurality of server computers 312–318 based upon PIDs is to have each PMDNS user application 204 direct its service query to the server computer that has been designated to service all service requests for such PIDs. Another manner in which the service queries may be segregated based upon PID is to designate one of the server computers as a router which receives all service queries and redirects, routes or passes those service queries for which it is not responsible to the designated server computer.

The PMDNS database server 210 load is also segregated into the plurality of databases 302–308, each of which stores a portion of the served user information. Each database may store information for a group of PIDs beginning with a specific letter, e.g., A–F, G–S, T–Z. Alternatively, each of the multiple PMDNS database servers could store information for a particular group of PIDs that begin with specific numbers, e.g., 1–2, 3–6, 7–0. Thus, using techniques that are generally known, the database requirements of the PMDNS database server 210 may be subdivided and serviced by a plurality of separate computers. Since each PMDNS application server computer 312–318 has access to each database 302–308, information requests are quickly serviced.

FIG. 4 is diagram illustrating a plurality of user records stored in a PMDNS database server according to the present invention and a portion of the information stored in such user records. These user records include user records 412, 414, 416 and 418. Each user record is associated with a particular user of the PMDNS system. A typical user of the PMDNS system uses several different types of terminals, each of which has its own address, etc. and is accessible via a particular network. For example, a wireless phone has a 10-digit mobile identification number (MIN) used to access the wireless phone via the PSTN or wireless network and a Mobile IP terminal has a 32-bit IP address used in the IP network. According to the present invention, each user record 412–416 includes a plurality of TIDs and a corresponding PID serves as an entry point for the user record, and the associated terminals. Each of the user records 412–418 also includes at least one PID 402, a password 404 and a plurality of terminal records, each of which includes a type 406, an address 408 and a time of last use 410. Each of the user records 412–418 also includes a user profile, a historical usage table and a network usage profile.

PIDs 402 identify the particular user associated with the user record and allow for access to the user record. For example TOM@NORTEL.COM is the PID for a user associated with user record 412. The user also has a Directory Number based PID, (972) 555-9876. With the IP network employed as the backbone, the PID may have two different formats, the email-based format and the Directory Number (DN) based format. The latter is used to accommodate the caller or the personal mobility service user that does not have email access. In this matter, the existing email address or DN may be easily designated as the user's PID. For a caller trying to reach the user from the data network, the email-based PID is useful. The DN-based PID is used here to accommodate callers coming from the voice network. On the other hand, for a PID user without email access, only the DN-based PID is employed. However, an email-based PID may be assigned to the user internally for PMDNS architecture efficiency, but will remain hidden to the user himself. Even though the PID takes two distinctive formats, it is the email-based PID that is used as the first index for the user profile in the database.

Each user record also includes a password 404 that is employed to ensure that only the particular user alters his or her user record. Further, the user has at least one terminal record associated with his or her user record, each terminal record corresponding to a user terminal. Each terminal record includes a type 406 and address 408 and last usage of the terminal 410. The type 406 indicates the type of terminal, e.g., voice, data, roaming data (RDATA), etc. The address 408 is the unique address of the respective terminal. The last usage 410 indicates the last time that the user used the respective terminal.

Each user record 412–418 also includes a user profile, a historical usage table and a network usage profile. The user profile includes preferences entered by the user which indicate the user's preferred delivery path, e.g., which TID to provide at what time of day and at what time. The historical usage table indicates the history of use of the user and a network usage profile for the user that is employed in predicting via which terminal the user may be reached. The network usage profile provides the probabilities that the user may be reached at each of the terminals.

As is shown, user having PID TOM@NORTEL.COM has three terminal records for voice terminals, a voice terminal accessible via the PSTN at the user's workplace, a cellular terminal, a voice terminal accessible via the PSTN at the user's home and a Voice Over Internet Protocol terminal. Thus, upon an accessing requesting to contact the user in a voice communication, the PMDNS system would return voice terminal addresses depending upon the last usage information for each terminal and the network usage profile. As is also illustrated, three data terminals are also associated with the PID, a data terminal accessible via an IP address at the user's workplace, a data terminal accessible via the PSTN at the user's home and a data terminal accessible via a cellular network. If a query is made to establish a data session with the user, the information for one of these three terminals will be returned, which terminal being determined based upon the time of last usage and the network usage profile.

User record 414 also has both an email based PID and a DN based PID. Further, user record 414 includes three voice terminals and a single data terminal. User record 416 includes both an emailed based PID and a DN based PID for an associated user. The user record 416 also includes four voice terminal records and three data terminal records. Note that one of the data terminals has the type RDATA as opposed to the usual DATA type. Such is the case because the address of the data terminal is dynamic. An example of such data terminal is a laptop computer having a modem or network port. The laptop computer is taken with a computer and, from time to time, connected to the PSTN or a network access port. When the laptop computer is coupled to the PSTN, it couples at a phone jack having a particular PSTN number. Further, when the laptop computer couples to a network access port, the network access port has a particular network address, e.g., IP address. When such connection is made, the user may initiate a registration of the laptop computer with the PMDNS application server, identifying its current network address or PSTN number. The PMDNS application server then sends the information to the PMDNS database server, entering the then current address in the corresponding terminal record.

User record 418 for still another user includes three voice terminal records, including one RVOICE terminal record. The RVOICE terminal record may be modified in the same fashion as a RDATA terminal record, and may correspond to a motel room voice terminal, for example.

Figure 5:
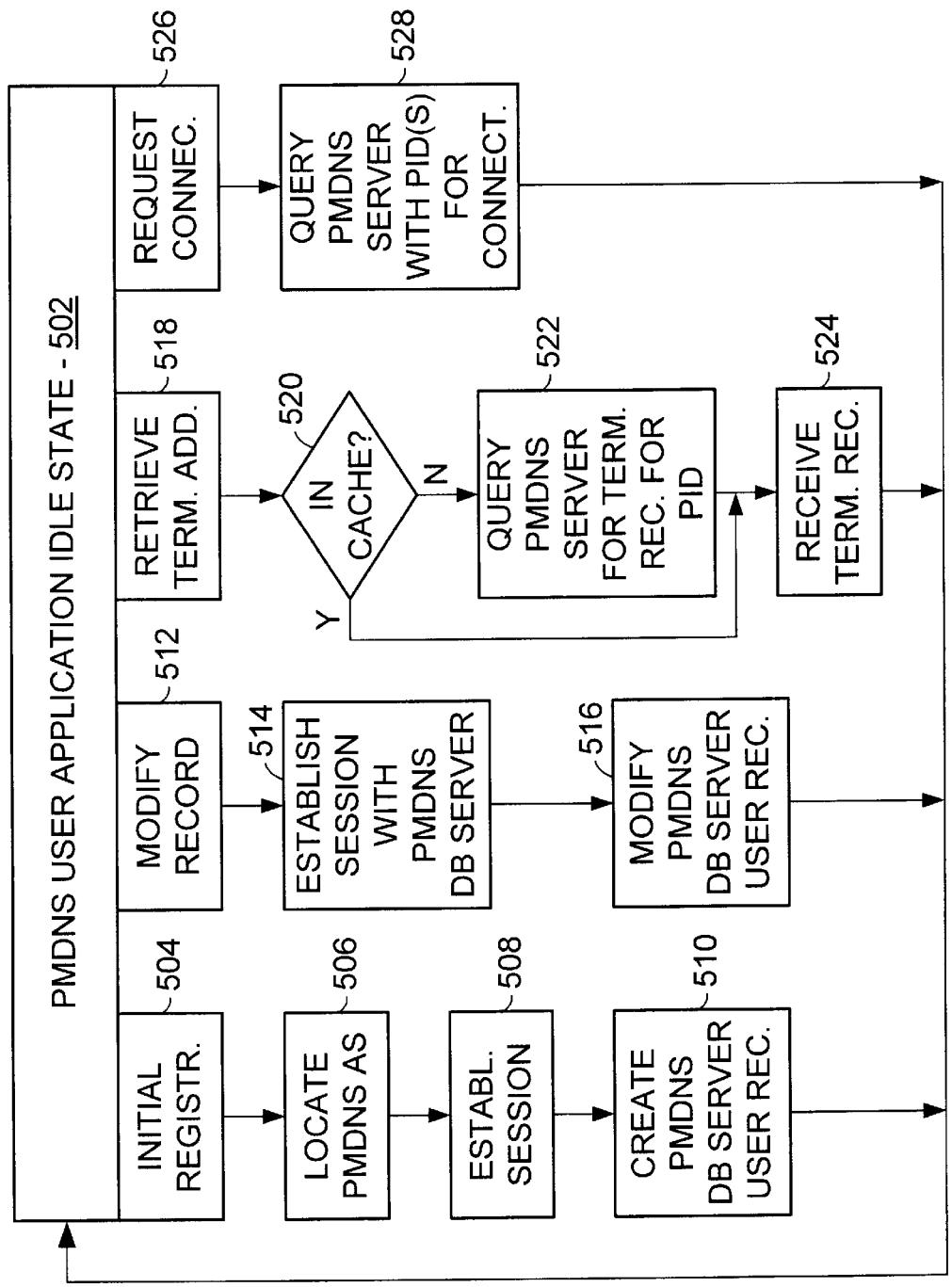
FIG. 5 is a logic diagram illustrating operation of a PMDNS user application according to the present invention.

FIG. 5 is a logic diagram illustrating operation of a PMDNS user application according to the present invention. As was described with reference to FIG. 2, the PMDNS user application resides upon a terminal of the user, such as a computer, a data terminal or a telephone have onboard processing capability. However, the PMDNS user application may also be resident in a gateway coupling an IP network to the PSTN, for example, if the terminal of the user does not support the PMDNS user application. Such would be the case for at least some telephones coupled to the PSTN that could not support the processing requirements of the PMDNS user application.

Operation of the PMDNS user application commences at step 502 where the PMDNS user application remains in an idle state until it receives an operation request. At step 504, the PMDNS user application receives a request for an initial registration of a user. Upon receipt of such request, operation proceeds to step 506 wherein the PMDNS user application locates the PMDNS application server. Once the PMDNS application server is found, the PMDNS user application establishes as session with the PMDNS application server. An interactive session between the PMDNS user application and the PMDNS application server continues at step 510 until a complete PMDNS application database user record is created for the user. From step 510, operation proceeds to step 502.

To locate the PMDNS application server at step 506, the PMDNS user application must know the address of its PMDNS application server. For the purpose of routing efficiency, a roaming mobile IP terminal or a roaming cellular phone user should be able to access a local PMDNS application server. For this purpose, PMDNS user application should be configured with two important parameters: the addresses of at least one of PMDNS application servers, PMDNS.ADDRESS; and the time to live (TTL) of the addresses, PMDNS.TTL.

The PMDNS user application supports both manual configuration and dynamic configuration. In manual configuration, the addresses of PMDNS servers are configured manually by a user or a network administrator. In dynamic configuration, a Dynamic Host Configuration Protocol (DHCP) provides configuration parameters to Internet hosts. These configuration parameters include an allocated IP address and domain name of the user terminal, DNS IP address, router IP address and subnet mask. The IP address of the PMDNS server can be a new parameter passed by DHCP.

Another method for locating the PMDNS server at step 506 includes using a SRV record in the DNS as an entry for the PMDNS server. Such an application requires that the server administrators add those records to the DNS entries of the server. To query a SRV record, the host either knows its own domain name or the domain name of its router (which can be acquired through DHCP or manually configured). If the domain name of the user host is known, the domain name is first to be used. Otherwise, the domain name of the router will be used.

A Service Location Protocol (SLP) may also be employed to find the PMDNS application server. SLP is an Internet protocol to provide the location of network services. SLP requires user agent (UA), service agent (SA) and directory agent (DA). SA in a network server advertises its service. DA in that network receives the advertisement and keeps the information. When a host needs to find the location of a service, UA in the host sends a service request to DA. DA sends a service reply with the address of a server which provides the requested service. The addresses of DA in a network can be provided to UA either by DHCP or by SRV record in DNS. If a network supports SLP, a PMDNS application server in that network supports a SA that registers itself to a DA.

Is In a PSTN network or a cellular network, accesses to the PMDNS service are made through gateways with the PMDNS user application located in the gateway. PMDNS service may be provided by several ISPs (providing the gateway) with each ISP having its own PMDNS user application (and/or PMDNS server application for the telephone network). The users in the network may subscribe to PMDNS service through different ISPs. Thus, the addresses of the PMDNS should be configured for divided user groups.

Still referring to FIG. 5, when a request is made to the PMDNS user application to modify a user record for the user contained in the PMDNS application server at step 512, operation proceeds to step 514 where the PMDNS user application establishes a session with the PMDNS application server. Modifications to the user record are made based upon user input at step 516. From step 516, operation returns to step 502.

One such parameter that may be altered is the user profile which directs communications to specific terminal(s) associated with the PID of the user. The user profile acts as a diary of its user, i.e. a schedule via which terminals/devices a user would like to be reached. The profile can be provided by the user according to the time of the day, the day of the week, and the date of the month. Hence, this function provides the user more control as where he/she would like to use which terminal. An example of a user profile is shown in Table 1.

TABLE 1

USER PROFILE

| TERMINAL | From Time | To Time | Day | DATE |
|---|---|---|---|---|
| Home (972) 123-1411 | 17:00 | 9:00 | — | — |
| Work (972) 321-1112 | 9:00 | 17:00 | — | — |
| Cellular (972) 213-4311 | — | — | Sat, Sun | — |

The user can then make changes to her/his user profile at step 516, for example, by stating that she/he will be reachable by e-mail during working hours and by fax otherwise. To accommodate the user with control over his/her user profile (or other user record components), the PMDNS server application acts as a middleman to forward the request from the user application to the PMDNS directory server.

In performing the operations of steps 512 to 516, two types of protocols may be involved. First, a new protocol is created to facilitate the communication between the user application and the server application. Second, LDAP is used to facilitate the communication between the server application and the directory server. An example of a message format that may be passed from a PMDNS user application to a PMDNS server application is illustrated in Table 2.

TABLE 2

| FIELD | MESSAGE FORMAT DESCRIPTION |
|---|---|
| Description ID | Assigned by the program that generates a request |
| Op code | Specifies the kind of message (assign, delete, query, response, etc.) |
| Resp code | Specifies the kind of response (no error, PID doesn't exist, etc.) |
| Qtype | Specifies the type of query (preference, service, etc.) |
| Reserved | Reserved for future use |
| Password | Current user password |
| Changed password | Assigned new password |
| PID length | A variable length string that describes the user identification |
| PID | User personal identification |

TABLE 2-continued

| FIELD | MESSAGE FORMAT DESCRIPTION |
|---|---|
| Op count | Number of entries in the preference section |
| Stime | Starting time of the day the user would like to be reached |
| Etime | Ending time of the day the user would like to be reached |
| Day | Day of the week the user would like to be reached |
| Date | Date of the month the user would like to be reached |
| TID length | Length in the TID field |
| TID | A variable length string that describes the terminal to be reached |

Still referring to FIG. 5, at step 518, the PMDNS user application is requested to retrieve one or more TIDs. The request may be made by the user or by an application running on the user's computer shared by the PMDNS user application. For example, the user may request that an email be sent to TOM@NORTEL.COM. However, TOM@NORTEL.COM is not an email address, but rather a PID. Thus, the PMDNS user application first retrieves an email address (TID) corresponding to the PID TOM@NORTEL.COM. Upon receipt of the TID, the PMDNS user application then interfaces with an email program resident upon the user's computer and the email message is sent. In this example, the TID for TOM@NORTEL.COM may be the same as the PID. Alternatively, the user may direct the email program to send the email with the caveat that TOM@NORTEL.COM is a PID and not an email address. In such case, the email address interfaces with the PMDNS user application to retrieve a TID based upon the PID TOM@NORTEL.COM. Upon receipt of the TID, the email program then sends the email to the TID.

From step 518, operation proceeds to step 520 wherein it is determines whether a requested TID (based upon a PID) is stored in a local cache memory of the PMDNS user application. If it is, the TID is sought and operation proceeds to step 524 where the TID is received. Alternatively, if the requested TID is not stored in local cache, operation proceeds to step 522 where the PMDNS user application sends a query to the PMDNS server application which includes the PID and a type of TID to be returned, e.g. data or voice. The PMDNS user application then receives the TID(s) at step 524. From step 524, operation returns to step 502.

At step 526, the user may direct the PMDNS user application to establish a connection between the user and a TID corresponding to a provided PID. An example of such an operation is when a user requests that a voice call be established between himself or herself and another user(s) associated with the PID. Another example of such an operation is when the user requests that a data connection be established between himself or herself and another user(s).

At step 528 then, the PMDNS user application queries the other user application or gateway with TID(s) for connections to be made. The other user application(s) then initiate setup of such communications. If the communication setup is for wireless or wireline telephone network communications, the gateway sends a setup message to the telephone network (or wireless network, as the case may be). From step 628, operation returns to step 502.

Figure 6A:
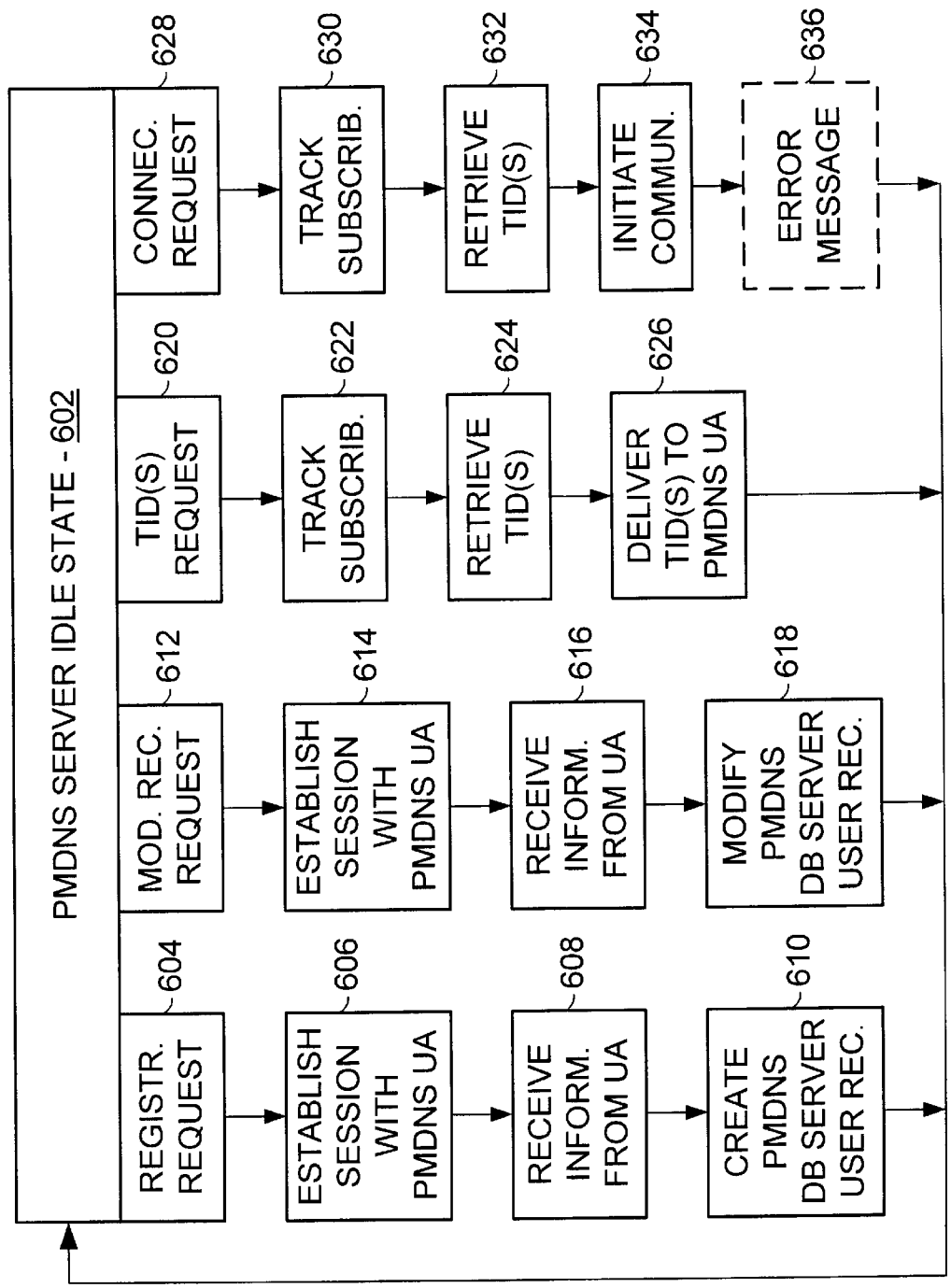
FIGS. 6A and 6B are logic diagrams illustrating operation of a PMDNS server according to the present invention.
Figure 6B:
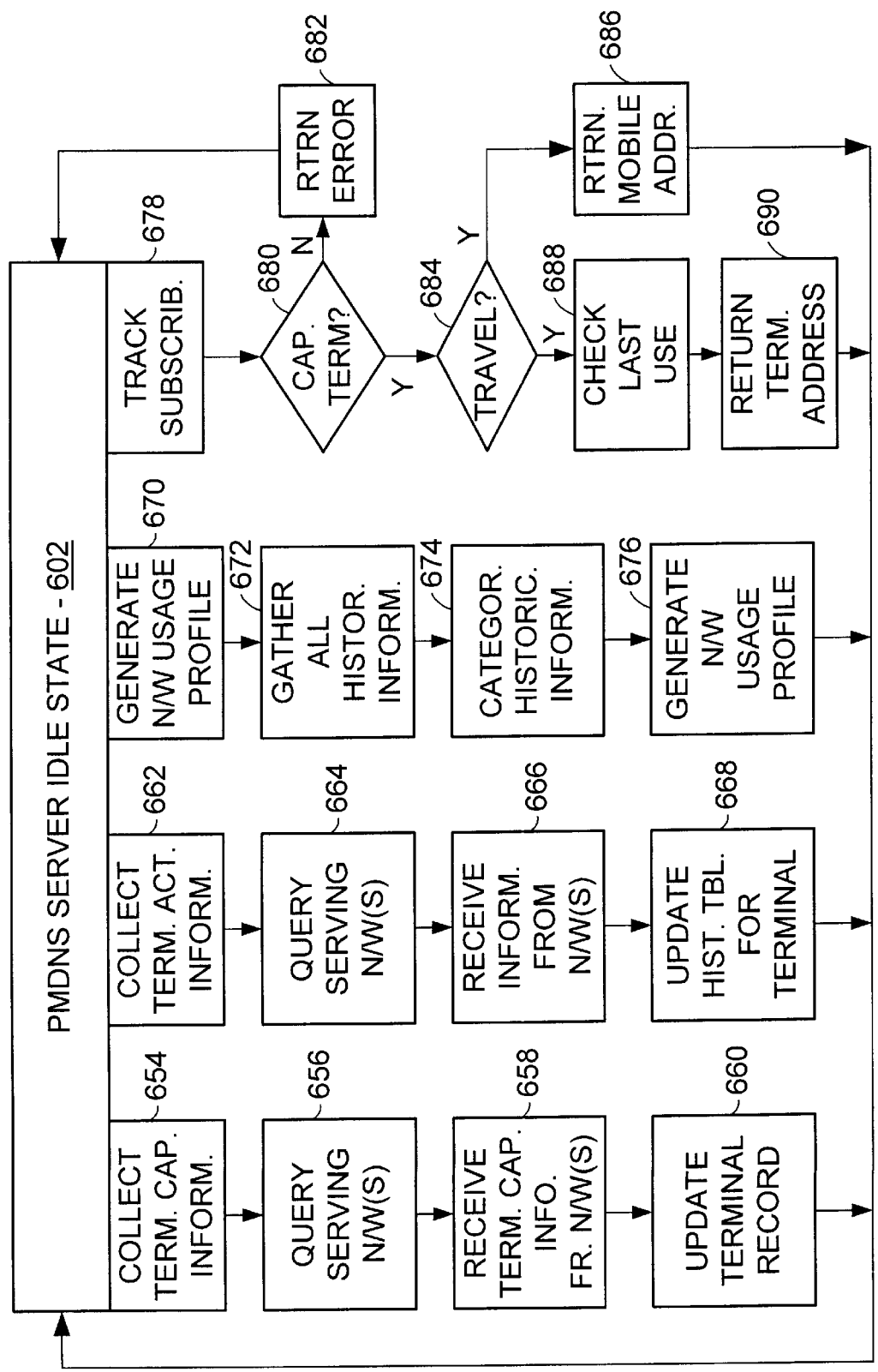

FIGS. 6A and 6B are logic diagrams illustrating operation of a PMDNS server constructed according to the present invention. Referring now to FIG. 6A, the PMDNS application server resides at an idle state 602 until an operation is requested or self-executed. At step 604, a user registration request is received. Upon such a registration request, operation proceeds to step 606 where the PMDNS application server establishes a session with the requesting PMDNS user application. Once the session is established, the PMDNS application server receives information from the PMDNS user application at step 608, such information including the user's PID, associated terminals, terminal information, network usage profile and other information regarding the user's communication capabilities and patterns. Then, at step 610, the PMDNS application server creates at least one PMDNS database application user record based upon the information received. From step 610, operation proceeds to step 602.

At step 612, the PMDNS server application receives a request from a PMDNS user application to modify a portion of a respective user's PMDNS database application user record. Upon receipt of the request to modify the user record, the PMDNS server application establishes a session with the PMDNS user application at step 614. Then, the PMDNS server application and the PMDNS user application interact at step 616 so that the PMDNS server application receives information from the PMDNS user application that is then used at step 618 to modify the PMDNS database application user record of the user. From step 618, operation returns to step 602.

At step 620, the PMDNS server application receives a request from a user to return one or more TID(s) for a user based upon a PID. Operation proceeds to step 622 where the PMDNS server application receives the PID for the user from the PMDNS user application. In retrieving the information, the PMDNS server application tracks the user at 622 (as will further be described with reference to steps 678–690 of FIG. 6B). Operation then proceeds to step 624 where the PMDNS server application retrieves the TID(s) from the PMDNS database application based upon the PID, the desired service option(s) and the results from tracking the user. The TID(s) are then returned to the PMDNS user application at step 626. From step 626, operation returns to step 602.

At step 628, the PMDNS server application receives a connection request from a PMDNS user application, requesting that the PMDNS server application initiate (or cooperate in initiating) a connection between the respective user and another user of the system. At step 630, the PMDNS server application tracks the user (as will further be described with reference to steps 678–690 of FIG. 6B). Then, at step 632 based upon the tracking at step 630, the PMDNS server application retrieves TID(s) for the user(s). Then, at step 634, the PMDNS server application initiates the communication (voice or data) between the user and one or more other users identified by the received PID(s).

In initiating the communication, the PMDNS server interfaces with another application that actually sets up the communication. For example, the PMDNS server may interface with a telephone switch for initiating a voice communication, a voice over internet program, an email application, a video conferencing application or such other communication that is designed to setup communications between users. If an error in communication setup results, the PMDNS server application sends an error message to the requesting PMDNS user application at step 636. From step 636, operation returns to step 602.

Referring now to FIG. 6B, from the idle state 602, the PMDNS server application may initiate (or be directed to initiate via timer expiration or PMDNS user application request) the collection of terminal capability information at step 654. Terminal capability represents the physical limitations of the terminal. For instance, a POTS telephone is only capable of making/receiving voice calls. Terminal capability is static information. It can be generated by PMDNS service providers or may be provided by the user via the PMDNS user application.

In one operation, the PMDNS server application queries the serving network(s) for a terminal whose capabilities are sought at step 656. The serving network may retrieve the terminal's capabilities from a database or may query the actual terminal for its capabilities. In either case, the serving network(s) returns the information to the PMDNS server application at step 658 and at step 660 the PMDNS server application updates the corresponding user records in the PMDNS database application according to the capabilities reported. From step 660, operation returns to step 602.

At step 662, the PMDNS server application collects terminal activity information. Such activity information may be periodically collected, collection may be initiated via the PMDNS user application or collection may be implemented when another trigger is met. For tracking a user's current TID, the PMDNS server application must try to gather all possible information about the terminal and intelligently analyze it. Such useful information includes the last active terminal address and time, the terminal network usage profile (time, day and frequency) and the current time.

Subscriber's current terminal network usage profile is difficult to obtain. However, user's recent terminal network usage profile may be obtained by collecting historical usage of the terminal from the networks in which the terminal operates. Thus, at step 664, the PMDNS server application queries the network(s) that service(s) the subject terminal.

This information is received at step 666 and an updated historical usage table for the terminal is created at step 668. From step 668 operation returns to step 602. Steps 662 through 668 may be repeated for each terminal that services a particular user.

The information collected at steps 662–668, as well as previously collected information may be used to generate a network usage profile for the user. The initiation of creation of the network usage profile starts at step 670. From step 670, all historical information for the terminal is gathered at step 672 and then at step 674 it is categorized into the relevant categories. Finally, at step 676, the historical usage information is used to generate a network usage profile for the user.

The PMDNS application server accumulates historical usage them in the historical usage table based upon accesses made by a respective user. Receiving a query from a user by a PMDNS application server indicates that the user is currently active. When the PMDNS application server receives a query from a PMDNS user application, it obtains the knowledge about the last active time and TID of the calling user's PID. Therefore, while the PMDNS application server requests the necessary information from the PMDNS directory server, it also updates the last activity and the historical usage tables of the calling user's PID on the PMDNS directory server. When updating the historical usage tables, it simply adds one more activity to the counter under the currently used terminal (for the user) at the current time.

User network usage profiles are created periodically by the PMDNS directory server based on user historical usage tables, which record the usage of different terminals of a PID in previous time period. For instance, the PMDNS application server may accumulate the usage of different terminals of a PID in historical usage tables for a week at steps 662 through 668. Then it creates the user network usage profiles using the historical usage tables at the end of the week and starts to accumulate the historical usage for the coming week at steps 670 through 676. Thus, the user network usage profiles indicates user's terminal network usage profile of the previous week.

A number of terminals under a PID may reside on the same location. For example, a user's computer and telephone at work are usually located in his/her office (probably on the same desk). When a user can be reached on his/her computer at work, then, most likely, he/she can be reached at his/her telephone at work. Thus, terminals under a PID may be grouped based on their locations for collecting statistics.

In most cases, terminals are grouped into "home", "office" and "mobile". A "mobile" group usually contains one terminal because it is very rare that two mobile terminals are co-located all the time. If a user has more than one mobile terminal, then they should be put in different groups (e.g., mobile1, mobile2, etc.). Similarly, if a user has more than one home and/or office, then that PID can have groups called "home1", "home2", "office1", "office2", etc.

A user has different user network usage profiles for different types of days (e.g., weekdays and weekends) and for the different terminal types. The PMDNS application server(s) accumulate PIDs' terminal usage data in different historical usage tables during a certain time period (e.g., a week). Table 3 below illustrates the accumulation of historical usage in a historical usage table for a particular user.

TABLE 3

| | historical usage table | | | | |
|---|---|---|---|---|---|
| Loc. | ... | 7–8 a.m. | 8–9 a.m. | 9–10 a.m. | 10–11 a.m. | ... |
| Home | ... | 29 | 5 | 3 | 1 | ... |
| Work | ... | 3 | 7 | 30 | 38 | ... |
| Mobile | ... | 8 | 22 | 8 | 4 | ... |

The information contained within Table 3 represents the data collected within an accumulation time period. The numbers in the table indicate the terminal usage at different locations and in different time intervals. For instance, number 30 in the third row and fifth column means that the user has used terminals at work 30 times in time interval of 9 a.m. to 10 a.m.

At the end of an accumulation time period (e.g., at the end of a week), the PMDNS application server stops accumulating terminal usage data in the historical usage table. This table is ready for use in creating a new user network usage profile for the user.

Table 4 is an example of a completed historical usage table that is based upon the information contained in Table 3. Similar to Table 3, each entry in Table 4 indicates the number of times the user used terminals at a particular location in a time interval of a day during a certain length of time (e.g., a week).

TABLE 4 completed historical usage table

| Loc. | ... | 7–8 a.m. | 8–9 a.m. | 9–10 a.m. | 10–11 a.m. | ... |
|---|---|---|---|---|---|---|
| home | ... | 32 | 10 | 4 | 2 | ... |
| work | ... | 4 | 10 | 35 | 43 | ... |
| mobile | ... | 12 | 30 | 10 | 5 | ... |

The end of an accumulation time period is also a beginning of the next accumulation time period for new historical usage table. Thus, at the same time the PMDNS application server starts to accumulate the user historical usage tables for the new accumulation time period.

A user network usage profile indicates the probabilities that a user can be reached at terminals in certain locations in different time intervals. There are two types of user network usage profiles: profiles for weekdays and profiles for weekends.

Given a user historical usage table, creating a network usage profile is straightforward. The probability that the user can be reached at terminals at a location in a particular time interval of a day is equal to the number of calls at that location in the time interval divided by the total number of calls in that time interval. In another word, the entry value in a cell in a user network usage profile is equal to the value in the relatively same cell position (in terms of row and column) in the historical usage table divided by the summation of all entry values in that column. The mathematical formula for computing the probability in the entries of user network usage profiles is illustrated in Equation (1) as:

$$prob(location, timeInterval) = \frac{\sum_{t \in location} count(t, timeInterval)}{\sum_{\forall loc} \sum_{d \in loc} count(d, timeInterval)}, \quad \text{Equation (1)}$$

where "$\forall loc$" means for all locations under the PID.

Table 5 is a network usage profile generated for a user (PID) that was derived from Table 4. The example is of user network usage profiles of weekdays type. For instance, the probability (66%) appearing in the second row and third column in Table 5 is equal to the entry value (33) in the second row and third column in Table 4 divided by summation of all values (33+5+12=50) in the third column in Table 4.

TABLE 5 network usage profile

| Loc. | ... | 7–8 a.m. | 8–9 a.m. | 9–10 a.m. | 10–11 a.m. | ... |
|---|---|---|---|---|---|---|
| Home | ... | 68% | 20% | 10% | 4% | ... |
| Work | ... | 8% | 20% | 70% | 86% | ... |
| Mobile | ... | 24% | 60% | 20% | 10% | ... |

Notice that user network usage profiles may not be accurate because they are based on previous terminal usage behavior of the user. Even a terminal network usage profile provided by the user himself/herself might not be able to precisely predict where the user is due to random factors of mobility behavior of human being. To achieve the best performance of PMDNS services an intelligent tracking algorithm is needed to compensate the inaccuracy of user network usage profiles.

At step 678, the PMDNS server application initiates tracking of a user (as was referenced previously at steps 622 and 630). Tracking is the PMDNS server application activity that returns at least one TID based upon a PID received from the PMDNS user application. At step 680, before attempting to find out the most probable terminal at which the called user user can be reached, the PMDNS server application checks whether the called user has any terminals capable of establishing the connection. If there are capable terminals under the user's PID, then PMDNS starts the efforts to track the user. Otherwise, PMDNS will return an error message informing the incapability of called user's terminal to the PMDNS user application at step 682. From step 682, operation returns to step 602.

If the called user has terminals capable of establishing the connection, as determined at step 680, the PMDNS application server will check whether the user associated with the PID is traveling. In doing this, the PMDNS server application first determines whether the user has a mobile phone. If the user has a mobile phone, the PMDNS application server interfaces with a home location register (HLR) of the wireless communication system servicing the mobile unit. In interfacing with the HLR, the PMDNS application server investigates the HLR information stored in the PMDNS database server to determine whether the mobile terminal is currently being serviced within its home area. This HLR access may be performed upon demand or, alternatively, may be performed periodically by the PMDNS application server for all mobile units being served.

Such a determination may be made based upon whether the mobile unit's "home" VLR currently provides its service (this information is available in the HLR). If the mobile unit is not currently being served by its home VLR, the PMDNS application server determines that the user is traveling at step 684 and proceeds with its operation to step 686. At step 686, the PMDNS application server returns a TID by invoking function "outOfTown(connectionType)" because the user is most likely out-of-town. The outOfTown function returns a TID that assumes the user is traveling, e.g., a TID for a cellular telephone, a TID for a laptop computer.

If the PID user record has no mobile phone listed, or a listed mobile phone is in its home VLR as determined at step 684, then the PMDNS application server checks the last activity for the user record (by investing the time of last usage 410 for each available terminal) at step 688. If the time that has passed since the last usage is longer than H_thresh minutes ago (e.g., H_thresh=1440 minutes=24 hours), then the last activity does not provide much information about TID's at which the user can b e reached. Thus, the PMDNS application server returns TID's by checking the network usage profile (i.e., invoking function "checkUsageProfile") at step 690.

If the time that ha s passed since last usage is less than M_thresh minutes ago (e.g., M_thresh=5 minutes), then the PMDNS server returns the last active terminal address as the TID to be reached for the PID at step 690. In this case, the user used that terminal very recently. It is very likely that he/she is still around the terminal and is most likely to be reached at the last active terminal address. If the time since the last activity is x minutes ago, with H_thresh<x<M_thresh, then the PMDNS server examines how the last activity fits the user network usage profiles. Based upon this determination, the PMDNS server returns a TID that it determines to be a most likely terminal for reaching the user. From both step 686 and step 690, operation returns to step 602.

Referring again to FIG. 1, various examples of operation according to the present invention are presented. In a first example, calling user initiates operation at phone 124 coupled to the PSTN 109 and desires to communicated with a called user (PID=calleduser@loc). In the example, a PMDNS user application is located at the gateway 110 since the phone 124 of the calling user does not support local function of the PMDNS user application. The calling user dials an outgoing PID number (corresponding to the called user) and the PSTN 109 infrastructure routes the call to the gateway 110. The gateway 110 verifies that the calling user has subscribed to the PMDNS service and sends a query with the launched PID to the PMDNS application server 150.

The PMDNS application server 160 accesses the PMDNS database server to find the current TID of the called user. The PMDNS application server then returns the TID to the PMDNS user application which corresponds to cellular phone 132. Alternatively, the PMDNS application server initiates a call between the phone 124 of the calling user and the cellular terminal 132 of the called user.

In a second example, the calling user is at terminal 126 and has subscribed to the PMDNS service via ISP X. The caller wants to make a call to Bob and starts the locally installed PMDNS user application with Bob's PID bob@number1.com. He also specifies he would like to talk to Bob via a H.323 call (Internet Telephony). PMDNS user application then queries the PMDNS application server with Bob's PID. The server replies with two ordered TID address groups of Bob. One group is the Bob's cellular phone 132 number, 972-123-4567, as well as the address of the gateway of the cellular network 114. The second is Bob's home phone number, 972-765-4321 and the address of its associated gateway (Bob's home phone is a group ID which Bob shares with his family, the number is usually given less priority unless PMDNS is very sure Bob is more likely to be reached in the address than other addresses). The PMDNS server 150 also instructs that the two numbers should be tried in sequence.

PMDNS user application first starts an H.323 session to the gateway 114 of Bob's mobile phone. The gateway 114 then converts the H.323 call to a POTS call and rings the Bob's mobile phone 132. If Bob does not answer the dialing, then Bob's home phone 124 is tried.

In still another example, the calling user originates a call from telephone 124. He dials the Bob's DN type PID, e.g., prefix+972-987-6543. The PSTN 109 collects dialed number and recognizes that it is an outgoing call to the PMDNS. The call is routed to the gateway 110 and the gateway 110 verifies that the caller is a user to the PMDNS service and sends a query with the dialed number to the PMDNS application server 140. The PMDNS application server 150 finds that the current TID of called user is bob@number1.com. The TID is returned to gatekeeper 152 along with sufficient termination information to allow the gatekeeper 152 to setup an H.323 call between the telephone terminal 124 and the TID returned.

Referring again to FIG. 2, additional description is provided. When a PID is dialed by a user of the PMDNS user application, the PMDNS user application sends a query to the PMDNS application server. The PID is merely an index grouping the actual TIDs of multiple terminals owned by the user. The query sent to the PMDNS application server, and its corresponding response is based upon DNS information flow, with no changes made. The message format is also DNS based, but has to go through some changes, with certain fields having new values assigned, to accommodate the personal mobility service.

The query towards the PMDNS database contains three pieces of information, the email-based PID launched, the dialing TID and the session characteristics. The launched PID is used as an index to search the database. In case a DN-based PID is dialed, a query to the translation database will be made first to find out the corresponding email-based PID, before entering the PMDNS database. It is assumed that the actual message can be overwritten on the way from the translation database to PMDNS database, this approach is proposed in favor of having query/response between user and translation database and PMDNS database.

The dialing TID is included to collect the caller's dialing pattern. If the caller is a PID service user and the terminal being used is one of his own enlisted terminals, then this information can be utilized to update his terminal network usage profile to influence future decision on which terminal to reach when the caller is being called. The network usage profile of the called, on the other hand, would be difficult to monitor. This is because when selected TID is used to set up a session, it is known which terminal is being reached, but remains unknown whether the called actually answers that terminal or not. Let alone there is the possibility of terminal answered by the answering service rather than the actual person.

The session characteristic is used to indicate nature of the incoming session, such as voice, data or multimedia. The session characteristic is needed because the compatibility of terminal capabilities influences the TID selection. It is a result of the logical AND of originating terminal's capability and its requested session. Possibly, it is achieved via some local negotiation at the originating terminal through the applications supporting personal mobility.

The response from the PMDNS directory server would contain two pieces of information as well, the gateway IP address and the selected TID. The former is used to establish the connection from the gateway to the terminating access switch (not application to IP terminal); the latter is used to establish the connection from the terminating access switch to the selected terminal to reach the user.

To accommodate the query and response for personal mobility queries, several changes are made in the existing DNS message format. Each DNS message begins with a fixed Header Section that contains a unique 2-byte ID field that the user uses to match responses to queries, 2-byte parameter field specifying the operation requested and a response code. The fields labeled XXCOUNT gives a count of entries in the corresponding sections that occur later in the message. For example, the field labeled QDCOUNT gives the count of entries that appear in the Question Section of the message.

In a domain name server message, each of the Answer Section, Authority Section, and Additional Information Section consists of a set of resource records (RRs) that describe names and mappings. Each RR describes one name.

For PID query/response, the same sections will be followed as in the DNS message format. The few changes made in extending new values in certain fields are itemized in the following tables. The fields in the Header Section are identified, with its meaning in the existing DNS and its extension under PMDNS. The key extension here is to open the reserved OPCODE field, use value 3 to indicate a PID query. This is necessary because the PID query would have a different format in QNAME field in the Question Section than its original counterpart used in DNS. For example, a QNAME in DNS may be tom@nortel.com, yet a QNAME in PMDNS may be (972) 684-0800. Realizing this is a PID query would prevent it from being discarded as having name error.

The invention disclosed herein is susceptible to various modifications and alternative forms. Specific embodiments therefor have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

What is claimed is:

1. A personal mobility system for connecting a calling user to a called user based upon a personal identifier of the called user, the personal mobility system comprising:

a personal mobility user application resident on a calling user's terminal that receives a request from a calling user, the request including the personal identifier of a called user;

a personal mobility server coupled to the Internet, the personal mobility server storing a plurality of user records;

each user record being respective to a user and indexed by a respective personal identifier, and each user record including a plurality of terminal records, each of the terminal records including a respective terminal address;

the personal mobility user application sending a service query to the personal mobility server via a communication path that includes the Internet, the service query including the personal identifier of the called user;

the personal mobility server accessing the user record for the called user based upon the personal identifier, selecting a terminal record of the plurality of terminal records and returning a respective terminal address to the personal mobility user application via a communication path that includes the Internet; and the personal mobility user application causing the calling user's terminal to access a called user's terminal via a network path selected by the calling user's terminal based upon the respective terminal address.

2. The personal mobility system of claim 1, wherein:

the user record further includes a network usage profile for the user; and the personal mobility server selecting the terminal record of the plurality of terminal records based upon the network usage profile of the called user.

3. The personal mobility system of claim 1, wherein:

the user record further includes a historical usage table for the user; and the personal mobility server uses the historical usage table to create the network usage profile for the user.

4. The personal mobility system of claim 1, wherein:

the service query includes an indication of the type of communication to be established between the calling party's terminal and the called party's terminal;

the personal mobility server selects the respective terminal address based upon the type of communication to be established between the calling party's terminal and the called party's terminal; and the type of communication is selected from the group including voice communications, video communications, and data communications.

5. The personal mobility system of claim 1, wherein:

when required, the network path includes a plurality of segments, the plurality of segments including a circuit switched segment and a packet switched segment.

6. The personal mobility system of claim 1, wherein:

the user record further includes a user profile for the user; and the personal mobility server selecting the terminal record of the plurality of terminal records based upon the user profile of the called user.

7. The personal mobility system of claim 1, wherein:

prior to sending the service query, the personal mobility user application investigates recent operations based upon the personal identifier; and if the personal mobility user application has recently accessed a called user corresponding to the personal identifier, the personal mobility user application retrieves a respective terminal address and accesses the called user's terminal corresponding to the respective terminal address.

8. The personal mobility system of claim 1, wherein the personal mobility server comprises:

a personal mobility application server that interfaces with the personal mobility user application; and a personal mobility database server coupled to the personal mobility application server that stores the user records.

9. The personal mobility system of claim 8, wherein:

the personal mobility application server includes a plurality of intercoupled server computers; and the personal mobility application server includes a plurality of intercoupled databases.

10. The personal mobility system of claim 1, wherein the personal mobility system serves a plurality of heterogeneous networks selected from the group consisting of Internet Protocol networks, Public Switched Telephone Networks, cellular wireless networks, wireless satellite networks, local area networks and wide area networks.

11. A method of completing a communication from a calling user to a called user, the method comprising:

storing a plurality of user records on a personal mobility server, each user record respective to a user and indexed by a respective personal identifier, and each user record including a plurality of terminal records, each of the terminal records including a respective terminal address;

receiving a request from a calling user at a calling user's terminal, the request including the personal identifier of a called user;

sending a service query from the calling user's terminal to the personal mobility server via a communication path that includes the Internet, the request including the personal identifier of a called user;

accessing by the personal mobility server the plurality of user records to identify a user record corresponding to the personal identifier;

of a plurality of terminal records associated with the identified user record, selecting by the personal mobility server a terminal record of the plurality of terminal records;

returning a respective terminal address to the calling user at the calling user's terminal; and accessing, by the calling user's terminal, the called user's terminal via a network path selected by the calling user's terminal based upon the respective terminal address.

12. The method of claim 11, further comprising:

storing a network usage profile of the user in a respective user record; and selecting the terminal record of the plurality of terminal records based upon the network usage profile of the called user.

13. The method of claim 11, further comprising:

storing a historical usage table for the user in a respective user record; and using the historical usage table to create the network usage profile for the user.

14. The method of claim 13, wherein the historical usage table is generated over time based upon the user's usage of the terminals identified in a respective user record.

15. The method of claim 11, wherein:

when required the network path includes a plurality of segments, the plurality of segments including a circuit switched segment and a packet switched segment.

16. The method of claim 11, further comprising:

storing a user profile of the user in a respective user record; and selecting the terminal record of the plurality of terminal records based upon the user profile of the called user.

17. The method of claim 11, further comprising:

prior to sending the service query, the calling user's terminal investigating recent operations based upon the personal identifier; and if the calling user's terminal has recently accessed a called user corresponding to the personal identifier, the calling user's terminal retrieving a respective terminal address and accessing the called user's terminal corresponding to the respective terminal address.

18. The method of claim 11, further comprising dividing load among a personal mobility application server and a personal mobility database server coupled to the personal mobility application server that stores the user records.

19. The method of claim 18, wherein:

the personal mobility application server includes a plurality of intercoupled server computers; and the personal mobility application server includes a plurality of intercoupled databases.

20. The method of claim 1, wherein a plurality of heterogeneous networks selected from the group consisting of Internet Protocol networks, Public Switched Telephone Networks, cellular wireless networks, wireless satellite networks, local area networks and wide area networks are serviced.

* * * * *